United States Patent [19]
Steiner

[11] Patent Number: 5,513,906
[45] Date of Patent: May 7, 1996

[54] METHOD OF CONTROLLING SENSITIVITY OF VEHICLE AUTOMATIC BRAKING PROCESS

[75] Inventor: Manfred Steiner, Winnenden, Germany

[73] Assignee: Mercedes-Benz AG, Germany

[21] Appl. No.: 337,432

[22] Filed: Nov. 8, 1994

[30] Foreign Application Priority Data

Nov. 8, 1993 [DE] Germany ............... 43 38 069.7

[51] Int. Cl.[6] ............... B60T 8/44; B60T 7/12; G01D 1/16; G01D 1/18
[52] U.S. Cl. ............... 303/125; 303/113.4; 303/114.3; 188/356
[58] Field of Search ............... 303/113.4, 93, 303/100, 114.3, 13, 14–16, 18, 113.3, 191, 193, 125, 135; 188/356, 357, 358, 359, 1.11; 60/545; 91/391 R, 391 A

[56] References Cited

U.S. PATENT DOCUMENTS 5,158,343 10/1992 Reichelt et al. ............... 303/113.4

5,350,225 9/1994 Steiner et al. ............... 303/113.4

FOREIGN PATENT DOCUMENTS

4028290C1 1/1992 Germany.

*Primary Examiner*—Douglas C. Butler
*Attorney, Agent, or Firm*—Evenson, McKeown, Edwards & Lenahan

[57] ABSTRACT

A method for determining the triggering sensitivity of an automatic braking process in motor vehicles. By a control element the driver can control within a specific range the threshold value which is effective for triggering. The permissible range is selected so that the effective threshold value can neither be reduced to such an extent that automatic braking is triggered at actuation speeds of the brake pedal which are normal for travel mode, nor increased to such an extend that it is impossible to trigger automatic braking process.

10 Claims, 1 Drawing Sheet

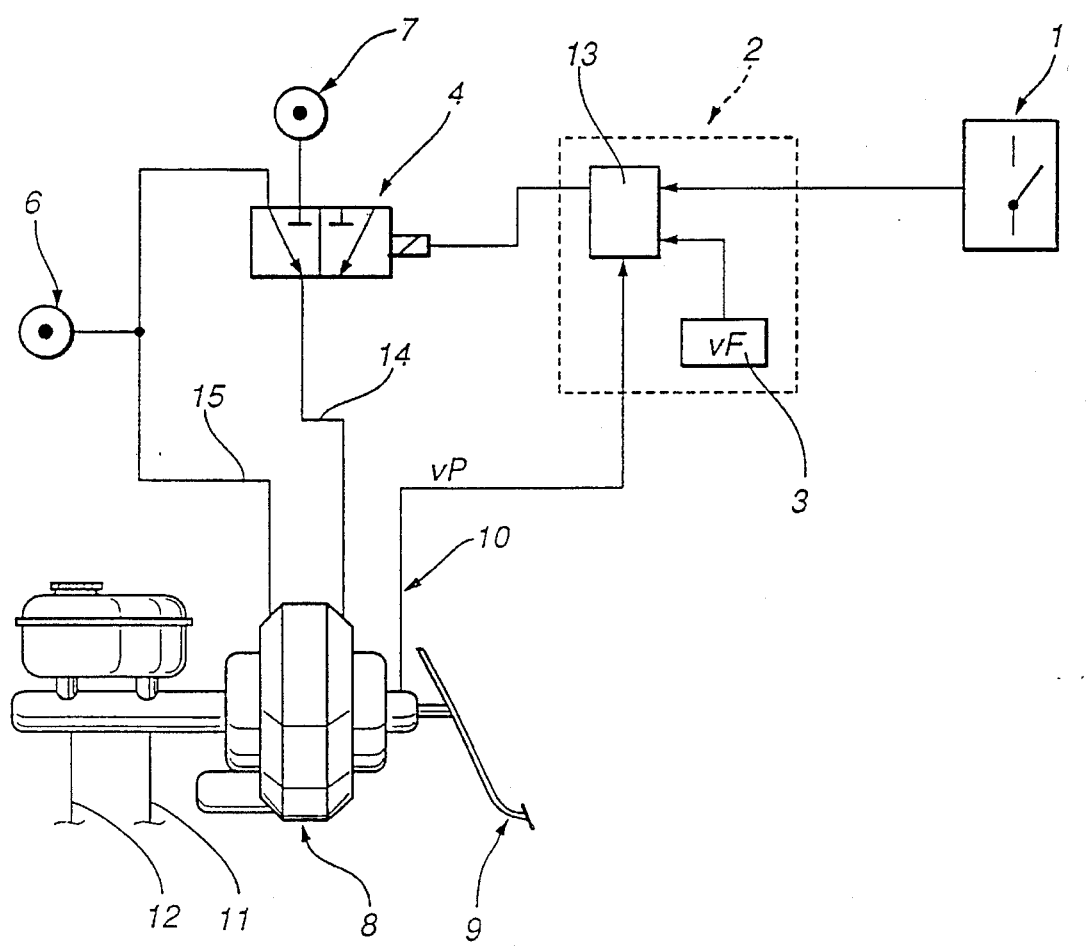

METHOD OF CONTROLLING SENSITIVITY OF VEHICLE AUTOMATIC BRAKING PROCESS

BACKGROUND AND SUMMARY OF THE INVENTION

This application is related to Application Ser. No. 08/337,426 filed on Nov. 8, 1994 in the name of Manfred Franz BRUGGER et al. for MONITORING METHOD AND DEVICE IN AUTOMATIC BRAKING PROCESS; to application Ser. No. 08/337,429 filed on Nov. 8, 1994 in the name of Siegfried RUMP et al. for METHOD FOR CONTROLLING THE TRIGGERING SENSITIVITY OF A VEHICLE AUTOMATIC BRAKING PROCESS TO MATCH DRIVER BEHAVIOR; to application Ser. No. 08/337,427 filed on Nov. 8, 1994 in the name of Siegfried RUMP et al. for METHOD FOR AUTOMATIC BRAKING OF MOTOR VEHICLES WITH AN ANTI-LOCK BRAKE SYSTEM; to application Ser. No. 08/337,443 filed on Nov. 8, 1994 in the name of Manfred STEINER et al. for DEVICE FOR TERMINATING AN AUTOMATIC BRAKING PROCESS IN MOTOR VEHICLES; and to application Ser. No. 08/337,425 filed on Nov. 8, 1994 in the name of Manfred STEINER et al. for METHOD FOR TERMINATING A MOTOR VEHICLE AUTOMATIC BRAKING PROCESS.

The invention relates to a method for determining the triggering sensitivity of automatic braking in a motor vehicle.

An automatic braking process of the generic type described herein is disclosed, for example, in German patent document DE 40 28 290 C1. From this publication it is known to trigger an automatic braking process whenever the actuation speed of the brake pedal exceeds a threshold value. In addition, the non-prepublished German patent application DE 43 25 940.5 discloses that the threshold value should be varied as a function of both the vehicle speed and brake pedal travel.

By selecting a suitable threshold value of the actuation speed of the brake pedal, reliable triggering of the automatic braking is ensured when required. However, to provide a feeling of safety to the driver it is important that the automatic braking process be triggered neither too frequently nor too late, according to the individual perception of the driver. In prior art systems, the driver cannot intervene in the triggering of the automatic braking process.

The object of the invention, therefore, is to provide an improved automatic braking process of the generic type in which the driver can influence the triggering of automatic braking, while at the same time assuring that automatic braking is always triggered when required.

This object is achieved by the automatic braking process according to the invention in which, by means of a control element the driver can control, within a specific range, the threshold value which is effective for the triggering. This range is selected so that the effective threshold value can neither be reduced so much that automatic braking is triggered at actuation speeds of the brake pedal which are normal for the travel mode, nor increased to the extent that it is impossible for the triggering criterion for automatic braking to be fulfilled.

Careful drivers will usually reduce the effective threshold value, since they wish to trigger the automatic braking process at an earlier time. Drivers who usually activate the pedals violently will as a rule raise the effective threshold value so that they do not unnecessarily trigger the automatic braking process.

According to the invention, a control element which can be actuated by the driver is provided in the interior of the vehicle. The control element is connected to the control device for triggering the automatic braking process. The control device determines the threshold value for the triggering of the automatic braking process from the fixed threshold value, as a function of the position of the control element.

A fixed threshold value, which has been determined as a function of the characteristic of the vehicle, is provided to the control device in the form of a value which is stored in a non-changeable memory. This value can be stated as a ratio of the actuation speed of the brake pedal to the maximum possible pedal travel. A possible value of the fixed threshold value (for example, a ratio of the actuation speed to the maximum possible pedal travel) lies in the range of approximately 2.

Starting from this fixed threshold value, by manipulating the actuating element, the driver can modify the threshold value for triggering the automatic braking process in a specific range which is determined by the relationship between the position of the control element and the derived threshold value. Preferably, the range extends between 90% and 120% of the fixed threshold value. However, the limits of the range are also dependent on the magnitude of the selected fixed threshold value. If this selected value is low, the range available for downward adjustment (that is, to values below the fixed threshold value) is smaller, and can as a result be larger above the fixed threshold values. Basically, all that has to be borne in mind here is that the threshold value cannot on the one hand be reduced to such an extent that automatic braking is triggered when brakes are applied during a normal travel mode, and on the other hand, cannot be increased to such extent that it becomes impossible for the driver to trigger automatic braking.

If continuously changeable control elements such as a slide valve or a rotary slide valve are used, the threshold value can be changed continuously between the limits prescribed by the extreme positions of the switch, which correspond to the range limits.

It is also possible to use a switch or control switch as control element. In both cases a specific number of switching positions is prescribed, between which the driver can select. These positions correspond to specific values of the threshold value within the permissible range. For example, three switch positions can be prescribed to which the three threshold values of 90%, 100% and 120% of the fixed threshold value are then assigned.

The use of control switches is particularly advantageous if the threshold value is to be reset to the fixed value whenever the vehicle is started. However, it is then advisable to indicate the current value of the threshold value to the driver in a visible fashion, for example on the instrument panel. This indication may be provided in the form, for example, of a numerical display, a display with appropriate symbols or a bar or column diagram.

Other objects, advantages and novel features of the present invention will become apparent from the following detailed description of the invention when considered in conjunction with the accompanying drawings.

BRIEF DESCRIPTION OF THE DRAWING

The single FIGURE of the drawing shows a schematic depiction of an arrangement for carrying out the method according to the invention.

DETAILED DESCRIPTION OF THE DRAWING

Referring to the drawing, the switch 1 is actuated by the driver. The control device 2 receives switching signals which are dependent on the switched position of the switch 1. The fixed threshold value vF is stored in the memory 3 of the control device 2. In addition, a signal which represents the actuation speed vP of the brake pedal 9 is fed to the control device 2 via a line 10. In the computing device 13 of the control device 2, it is then evaluated whether the actuation speed vP lies above the threshold value which is determined from the switched position of the switch 1 and the fixed threshold value vF.

The switching valve 4 is driven via a control line. If automatic braking is not actuated, the switching valve connects the two pressure lines 14, 15 of the brake booster 8 to the system pressure source 6 of the brake circuit. If automatic braking is triggered, the switching valve 4 is moved into the other switched position, in which the pressure line 14 arranged on the side of the brake pedal 9 is connected to the second pressure source 7, so that brake pressure greater than that which corresponds to the position of the brake pedal, is produced by the pressure from the second pressure source 7 in the brake booster 8. The brake pressure which is produced is passed on via the pressure lines 11, 12 of the front or rear brake circuit to the brakes (not shown).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for controlling activation sensitivity of a vehicle automatic braking system of the type wherein a brake pressure greater than that which corresponds to position of a brake pedal of said vehicle is applied to brakes of said vehicle whenever actuation speed of said brake pedal by a vehicle operator exceeds a predetermined threshold value, said apparatus comprising:

a control device in a passenger compartment of said vehicle, said control device being operatively coupled to said vehicle automatic braking system, and having a moveable control element which is manually operable by said vehicle operator;

means for varying said activation sensitivity of said vehicle automatic braking system according to performance and driving habits of said vehicle operator to achieve said vehicle operator's feeling of safety, by adjusting said predetermined threshold value of said actuation speed of said brake pedal as a function of position of said moveable control element; and means for limiting said adjusting of said predetermined threshold value to a predetermined range of values.

2. Vehicle automatic braking system according to claim 1 wherein said means for adjusting said predetermined threshold value is operable to select among a plurality of discrete values.

3. Vehicle automatic braking system according to claim 1 wherein said means for adjusting said predetermined threshold value is continuously adjustable within said predetermined range.

4. Method of controlling activation sensitivity of a vehicle automatic braking system of the type wherein a brake pressure greater than that which corresponds to position of a brake pedal of said vehicle is applied to brakes of said vehicle whenever actuation speed of said brake pedal by a vehicle operator exceeds a predetermined threshold value, said method comprising the steps of:

providing a control device in a passenger compartment of said vehicle, said control device being operatively coupled to said vehicle automatic braking system, and having a moveable control element which is manually operable by the vehicle operator; and varying said activation sensitivity of said vehicle automatic braking system according to preference and driving habits of said vehicle operator in order to achieve said vehicle operator's feeling of safety, by adjusting said predetermined threshold value of said actuation speed of said brake pedal as a function of position of said manually operable moveable control element;

wherein adjustment of said predetermined threshold value is limited to a predetermined range of values.

5. Method according to claim 4 wherein one of at least two prescribed, discrete values is selected for the threshold value by means of the control device.

6. Method according to claim 4 wherein the position of the moveable control element of the control device can be continuously changed between two limit positions, each position of the moveable control element corresponding to a value within the predetermined range of threshold values.

7. Method according to claim 6 wherein the control device comprises one of a rotary slide valve land a slide valve.

8. Method according to claim 4 wherein whenever the vehicle is started the threshold value is set to the predetermined threshold value.

9. Method according to claim 8 wherein the control device comprises a pressure-button switch, the position of the moveable control element of the control device being indicated visually.

10. Method according to claim 4 wherein the predetermined range extends between 90% and 120% of the predetermined threshold value.

* * * * *